April 2, 1968  J. L. RITCHEY ET AL  3,376,184
PRESSURE BONDING SYSTEM FOR SPANWISE REINFORCED AIRFOILS
Filed June 11, 1965
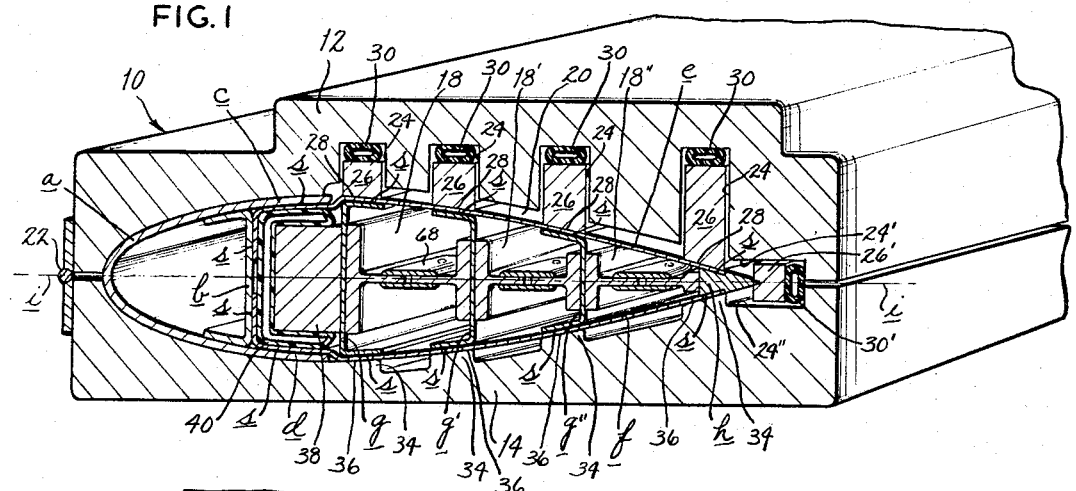
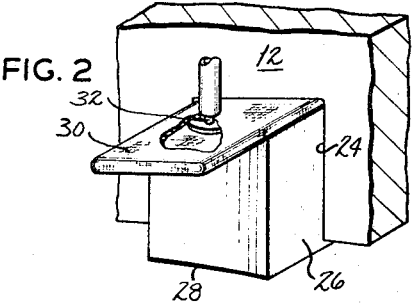
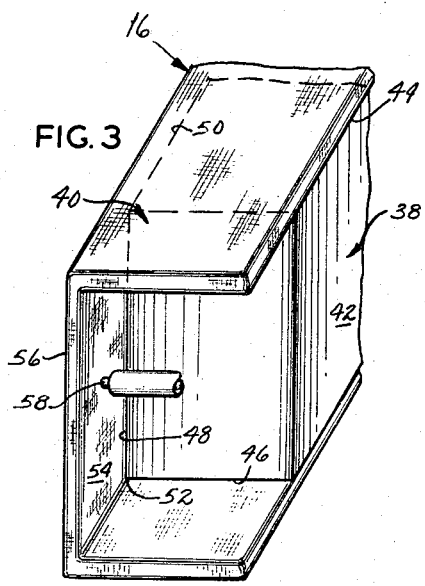
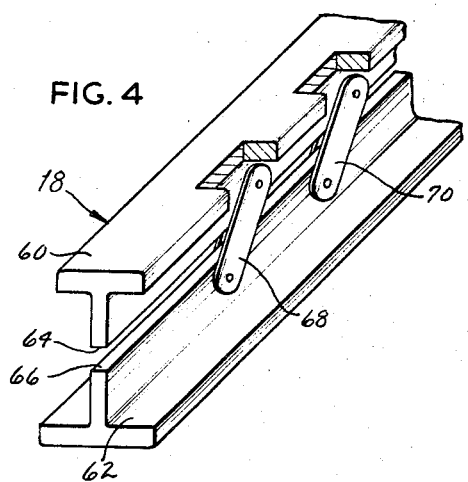
INVENTOR
STANLEY STEED, JACK L. RITCHEY
AND WINSTON E. BROWNLEE
BY
ATTORNEY United States Patent Office 3,376,184
Patented Apr. 2, 1968

3,376,184
PRESSURE BONDING SYSTEM FOR SPANWISE REINFORCED AIRFOILS
Jack L. Ritchey, Traverse City, Winston E. Brownlee, Sutton's Bay, and Stanley Steed, Traverse City, Mich., assignors, by mesne assignments, to Lawrence H. Egland, Frank Hohman, and Allan Donald, as trustee
Filed June 11, 1965, Ser. No. 463,252
8 Claims. (Cl. 156—580)

The present invention relates generally to a bonding fixture assembly, and more particularly to an inflatable, pressure-applying mandrel tool which coacts with a female pressure-applying fixture.

In the manufacture of hollow, spanwise-reinforced airfoils such as helicopter rotor blades, it is desirable, in a single bonding operation, to bond reinforcing-spacer channels to afterbody skins and simultaneously to bond such structure to a spar. Such bonding operations may involve many adhesive seams, all of which require the application of bonding pressures to insure an effective bond. Particularly when the members are formed of sheet metal, the problems presented in such bonding operations include: (1) preventing relative movement which would misalign the structural members and (2) insuring that the pressure is evenly applied into corner radii of the structural members.

Therefore, among the objects of the present invention are the provisions of a fixture assembly for use in bonding hollow structural members wherein:

Even, bladder-like bonding pressures are applied outwardly over the inner surfaces of the structural members and into corner radii by means of a simple rugged mandrel tool which is readily inserted and removed; and The forces and reactions applied internally of such members are balanced by externally applied fluid pressures concentrated outwardly of seams to be bonded.

These purposes (as well as others apparent herein) are achieved generally by providing a fixture assembly having upper and lower female fixture parts that mate at a parting plane. The fixture parts are hollowed from the parting plane to define an airfoil-shaped cavity in which structural members to be bonded are received. The upper female fixture part has spaced-apart parallel-sided longitudinal grooves recessed from the airfoil-shaped cavity. Within each of the grooves a rigid rail memebr is slidably fitted, with an inflatable pressure bag behind it. Each pressure bag drives a rail inwardly to apply bonding pressure. The lower female fixture part has fixed pressure-applying surfaces presented in chordwise registration with the slidable rail members of the upper fixture part.

A longitudinal mandrel tool is provided for insertion within the interior of the structural members to be bonded. The mandrel tool includes a rigid mandrel member having a front surface which meets its upper and lower surfaces along two longitudinal edges. To these surfaces a flat-formed inflatable pressure bag, of the type having side walls reinforced against elongation in tension, is adhered so as to cover the two edges of the mandrel member.

When all of the pressure bags of the female fixture and mandrel tool are inflated, the forces and reactions applied internally are balanced by the pressure-applying fixed surfaces and slidable rails of the female fixture parts.

Utilization of the present invention will become apparent to those skilled in the art from the disclosure made in the following description of the preferred embodiment of the invention as illustrated in the accompanying drawing, in which:

FIG. 1 is a partial perspective view of a cross-sectioned bonding assembly of the present invention with typical airfoil structural members including a spar, reinforcing channels, and afterbody skins, shown in their positions for adhesive bonding within the assembly;

FIG. 2 is an enlarged fragmentary end view of one of the upper rail members and its pressure bag in place within the upper fixture part of the assembly of FIG. 1;

FIG. 3 is a detailed fragmentary view of an end of the inflatable mandrel tool of the fixture assembly of FIG. 1; and FIG. 4 is an enlarged fragmentary perspective of an internal force-transmitting member shown aft of the inflatable mandrel tool in FIG. 1.

Referring now to the drawing wherein like reference charcters designate like or corresponding parts throughout the several views, there is shown in FIG. 1 a bonding fixture asembly, generally designated 10, for use in bonding hollow, spanwise-reinforced airfoils. The bonding fixture assembly, generally designated 10, for use in bond-fixture parts 12, 14 respectively, an inflatable mandrel tool 16, and a plurality of force-transmitting internal members 18, 18' and 18''.

Structural members to be bonded

As shown in FIG. 1 the airfoil to be fabricated includes hollow metal relatively rigid leading edge spar $a$ including a vertical reinforcing web $b$. Upper and lower afterbody skins $e$ and $f$ are tucked under and bonded against the inner surfaces of margins $c$ and $d$ of the spar $a$ which extend aft of its web $b$. At their forward ends the skins $e$, $f$ are turned inward to provide surfaces which may be bonded to the aft side of the spar's reinforcing web $b$. Three spanwise afterbody reinforcing channels $g$, $g'$ and $g''$ are shown spaced from each other to provide internal support to the afterbody skins $e$ and $f$. The channel $g$ is adhesively bonded to the afterbody skins just aft of the margins $c$ and $d$ of the spar $a$ at the point of maximum airfoil thickness. The channels $g'$ and $g''$ are similarly bonded to the afterbody skins $e$ and $f$ at chordwise intervals aft of the channel $g$ and each is of such height as to permit the skins to converge toward each other and meet at a trailing edge insert $h$. The securement of the skins $e$ and $f$ to the trailing edge $h$ likewise utilizes an adhesive bond.

In the bonding operation of the airfoil shown in FIG. 1, there are a total of twelve seams $s$ of adhesive, to which bonding pressures are to be simultaneously applied. For purposes of clearly illustrating these seams $s$ and the pressure-applying apparatus of the present invention, conventional elements used to heat the assembly have been omitted from the drawings.

Upper and lower fixture parts

The upper and lower fixture parts 12 and 14 shown extend longitudinally and meet along a substantially horizontal plane, referred to as the parting plane and designated by the dash line $i$—$i$. Each of the fixture parts 12, 14 are hollowed from the parting plane $i$—$i$ to define an air-foil-contoured cavity 20 within which the airfoil structural members are received during the bonding operation. Suitable hinges 22 are provided at the parting plane $i$—$i$ so that the upper fixture part 12 may be swung pivotally upward to open the fixture parts and provide access to the airfoil-contoured cavity 20.

Fastening means (not shown) are provided along the opposite sides of the fixture parts 12, 14 to secure the parts together.

Referring specifically to the upper fixture part 12 in FIGS. 1 and 2, there are shown fluid pressure-applying means for resiliently applying bonding pressures to those portions of the upper afterbody skin $e$ aligned with the spanwise reinforcing channels $g$, $g'$, $g''$ and the trailing edge insert $h$. Such pressure-applying means includes four longitudinally extending, parallel sided guide grooves 24 spaced chordwise from each other at locations corresponding to the positions of the spanwise reinforcing channels $g$, $g'$, $g''$ and the trailing edge insert $h$. Each of the guide grooves 24 communicates with the airfoil-contoured cavity 20 and is slidably fitted with a rail member 26 which extends the length of the grooves 24. The rail members 26 terminate at their lower ends in contoured surfaces 28 which correspond to the curvature of the upper afterbody skin $e$ against which they are engaged during bonding. Recessed within the grooves 24 and above the upper ends of the rail members 26, there are provided flat-formed inflatable pressure bags 30 which extend the full length of the rail members 26. At one of their ends the pressure bags 30 each have an air pressure inlet stem 32. By air pressure means (not shown) the bags 30 may be inflated to resiliently apply bonding pressures to the adhesive seams $s$ between the afterbody skin $e$ and the reinforcing channels $g$, $g'$, $g''$ and the trailing edge insert $h$. Preferably these pressure bags 30 have reinforced side walls and are of the type which may be dilatably inflated, as disclosed in the copending application Ser. No. 255,998 filed Feb. 4, 1963, by Winston E. Brownlee and Jack L. Ritchey, now Patent No. 3,348,476.

The lower fixture part 14 has four raised bosses 34 which are spaced-apart from each other to present pressure-applying surfaces 36 in registration with the slidably disposed rail members 26 of the upper fixture part 12, which in turn are aligned with the reinforcing channels $g$, $g'$, $g''$, and the trailing edge $h$. The bosses 34 extend the length of the fixture assembly 10 and their pressure-applying surfaces 36 are contoured to correspond to the curvature of those portions of the lower afterbody skins $f$ which they engage during the bonding operation.

As will be discussed, the rails 26 exert forward force components. If desired, additional forward force may be applied by pressure-applying means including a groove 24' in the upper part 12 and a corresponding groove 24" in the lower part 14, together accommodate a parallel sided forwardly slidable trailing edge pressure rail 26' and behind it a pressure bag 30'.

Mandrel Tool

Referring to FIGS. 1 and 3 the inflatable mandrel tool 16 (employed internally and enclosed by the web $b$, the channel $g$, and the skins $e$, $f$) is shown as consisting of a substantially rectangular longitudinally-extending mandrel member 38 and a flat-formed pressure bag 40 adhered to three of its four sides. The mandrel member 38 is preferably a solid aluminum bar having an aft surface 42, upper and lower surfaces 44, 46, and a front surface 48. The upper and lower surfaces 44, 46 meet the front surface 48 along longitudinal edges 50 and 52. The flat-formed pressure bag 40 has side walls of reinforced construction so as to resist elongation in tension; preferably several plies of glass fiber cloth are vulcanized in rubber. One side wall 54 of the flat-formed bag 40 is adhered to the top, bottom and front surfaces of the mandrel member 38 so as to cover the longitudinal edges 50 and 52. Its opposite side wall 56 is presented outwardly from the mandrel member 38 so that it may expand forwardly, upward and downward, thus to apply internal pressures to the skins $e$ and $f$ along those portions which are to be bonded to the reinforcing web $b$ and the aft-extending margins $d$ and $e$ of the spar $a$. An air inlet stem 58 is provided at one end of the bag 40.

Force-transmitting internal members

The force-transmitting internal members 18, 18' and 18" consist of two T-shaped rails which are disposed in opposition to each other along their narrow edges 64 and 66 respectively. The rails 60 and 62 are held together by pivotable links designated 68 and 70 (see FIG. 4) which render them expansible from each other. When the rails 60 and 62 are so positioned to bring the links 68, 70 perpendicular to the rails, the members 18, 18' and 18" assume their greatest width and can transmit forces rigidly.

The three force-transmitting internal members 18, 18' and 18" are inserted within the airfoil contoured cavity 20 and expanded from one another by means of their links 68 and 70. The internal member 18 is provided between the reinforcing channels $g$ and $g'$, the internal member 18' is provided between the reinforcing channels $g'$ and $g''$, and the internal member 18" is provided between the reinforcing channels $g''$ and the trailing edge $h$. As will be apparent these internal members 18, 18' and 18" serve to support the reinforcing channels $g$, $g'$ and $g''$ during the bonding operation and transmit bonding pressure in the chordwise direction.

Operation

In using the bonding fixture assembly described hereinabove, airfoil structure members, such as the leading edge spar $a$, the afterbody skins $e$, $f$, the spanwise reinforcing channels $g$, $g'$ and $g''$, and the trailing edge insert $h$ are provided with suitable bonding adhesive along the seams $s$. These structural members, and the contracted mandrel tool 16 with the bag 40 deflated, and the force-transmitting internal members 18, 18' and 18" are then fitted together in the cavity 20 in the positions as shown in FIG. 1. The upper fixture part 12 is then closed and securely fastened to the lower fixture part 14.

After the heating elements (not shown) are actuated, the flat-formed pressure bags 30 and 40 are inflated by supplying fluid pressure, such as compressed air, to the respective inlet stems 32 and 58 of the bags. The inflation of pressure bags 30 behind the rail members 26 causes them to be driven inward into the cavity 20, where they resiliently apply bonding pressures, along their entire spanwise lengths, to the adhesive seams $s$ between the upper afterbody skin $e$ and the reinforcing channels $g$, $g'$ and $g''$ and the trailing edge insert $h$. The forces exerted in the vertical direction by the rail members 26 are reacted at the pressure-applying surfaces 36 of the bosses 34 of the lower fixture part 14. Thus, suitable bonding pressures are simultaneously provided at those seams $s$ directly above the bosses 34.

Because the lower surfaces 28 of the rail members 26 are contoured to correspond to the curvature of the airfoil afterbody skins $e$ and $f$, the bonding forces initiated by the inflation of the pressure bags 30 have a component directed inwardly and forwardly. The pressure reactions along the bosses 34 of the lower fixture part 14 include similar forward components. The forward components of these bonding pressures and reactions, if not resisted would tend to press the skins $e$, $f$ and the internal reinforcing channels $g$, $g'$ and $g''$ forward and to misalign them.

In the present invention these forwardly directed force components are reacted by the aft section of the mandrel tool 16 when its pressure bag 40 is inflated. That is, the inflation of the pressure bag 40 forces the mandrel member 38 aft against the channel $g$ and in opposition to those forwardly-directed forces resulting from inflation of the pressure bags 30. Thus aft-directed forces resulting at the mandrel tool 16 are carried aft by the network of channels $g$ and internal members 18. The bonding together of the structural members is thus effected under a substantial balance of the resiliently applied forces initiated from the inflation of the pressure bags 30 and the internal pressure bag 40. As mentioned, the optional provision of a trailing edge pressure rail 26' and bag 30' may be employed to augment such balance.

The mandrel tool 16 possesses unique properties and advantages which distinguishes it functionally from heretofore used pressure-applying means, such as inflatable reinforced-wall pressure hoses or flexible expandable bladders. An inflatable hose is difficult to insert and remove from a pressure cavity unless its diameter is relatively small. When fully inflated, it will not exert even pressures into the corners of the cavity. An expansible bladder will, when inflated, exert an even pressure against the entire surfaces which restrain it; but it is well nigh impossible to insert and remove a bladder from an internal cavity within a helicopter rotor blade, where for example the largest cross-section dimensions of the internal sections may be less than two inches while its length may be in excess of twenty feet.

The present mandrel tool 16 possesses such tightness and compactness as to be readily inserted and removed as if it were a solid mandrel; yet, as to those surfaces which its pressure bag 40 comes into contact, pressure is applied as evenly as would be accomplished by the use of an expandable bladder.

FIG. 3 shows the mandrel tool 16 with its pressure bag 40 completely deflated, as by the use of a vacuum, which is readily applied at the bag inlet stem 58. When so deflated, the bag 40 hugs the upper, lower and forward sides 44, 46, 48 of the rectangular aluminum mandrel member 38; in this condition the mandrel tool 16 is readily handled for insertion and withdrawal into and from the cavity. In contrast, when in use its pressure bag 40 is inflated as shown in FIG. 1, and it dilates as there shown. By this dilation it presses forwardly for complete engagement against the aft vertical surfaces of the spar web b; it presses tightly into the small corner radii between the spar web b and the upper and lower spar margins c, and it presses the skins e, f upwardly and downwardly respectively, against the spar margins c, d. The pressure so applied is even, just as would be obtained by confining a flexible bladder. Yet the pressure bag (unlike a reinforced wall pressure hose) is capable of exerting a fluid-like pressure outwardly against the internal corner radii of the airfoil structural members. For removal, application of a vacuum to the inlet stem 58 again deflates the bag 40 tightly and compactly against the aluminum mandrel member 38.

Obviously, many modifications and variations of the present invention are possible in view of the above teachings. It is therefore to be understood that, within the scope of the appended claims, the invention may be practiced otherwise than as specifically described.

We claim:

1. A bonding fixture assembly for use in bonding structural members to form a hollow spanwise-reinforced airfoil or the like, comprising
    a female fixture having longitudinally-extending upper and lower parts hollowed from a parting plane to define an airfoil-shaped cavity wherein to receive such structural members,
    first fluid pressure-applying means recessed within at least one of said fixture parts aft of the point of maximum thickness of such shaped cavity for resiliently applying forces to such structural members inwardly and forward, and
    a mandrel insertable and removable longitudinally into and from said cavity of said fixture inwardly of such structural members and forwardly of said first fluid pressure means, said mandrel having second fluid pressure-applying means for applying forces to such structural members outward and aft in opposition to those applied by said first fluid pressure-applying means,
    whereby, bonding together of such structural members may be effected under a substantial balance of such resiliently applied forces.

2. The bonding fixture assembly as defined in claim 1, wherein
    said mandrel and second fluid pressure-applying means comprise a longitudinally-extending rigid mandrel member covered on more than one side by a dilatably inflatable pressure bag of such size, when said bag is deflated, as to be readily insertable and removable, and
    means to inflate said covering bag,
    whereby to apply even, bladder-like pressure outwardly over those inner surfaces of such structural members which said bag contacts when so inflated.

3. The bonding fixture assembly as defined in claim 1, especially adapted for use with those airfoils whose spanwise-reinforcements are aft of the point of maximum airfoil thickness, wherein
    one of said upper and lower fixture parts has recessed within it and communicating with the cavity so defined, a plurality of spaced-apart longitudinally-extending parallel-sided grooves,
    and wherein said fluid pressure-applying means includes rigid rail members slidably fitted within each of said fixture part grooves, and
    inflatable pressure bags inserted within each of said grooves beneath said rail members,
    said grooves being spaced chordwise at locations corresponding to the spanwise-reinforcements of such airfoils,
    together further with force-transmitting internal members insertable within such airfoil between its spanwise-reinforcements and aft of said mandrel.

4. The bonding fixture assembly as defined in claim 3, wherein the other of said upper and lower fixture parts has a plurality of fixed pressure-applying surfaces along the airfoil-shaped cavity defined by the female fixture and opposite to and in registration with said slidably disposed rail members,
    whereby the resistance offered by said pressure-applying surfaces combines with the forces applied by the rail members opposite thereto, to effect bonding forces along the upper and lower surfaces of such airfoils.

5. A mandrel tool for use in bonding hollow members having a small internal corner radius, comprising
    a longitudinally-extending rigid mandrel member having at least two adjacent side surfaces adjoining at an edge, and
    a flat-formed, inflatable pressure bag of the type having side walls reinforced against elongation in tension, one of its side walls being adhered to said mandrel side surfaces and covering said edge,
    whereby, on positioning the mandrel member with its said covered edge inside the corner radius of the members to be bonded, inflation of said pressure bag caused it to apply even, bladder-like pressure outwardly against such corner radius.

6. A mandrel tool for use in bonding hollow members including a longitudinal internal surface bounded above and below by small internal corner radii, comprising,
    a longitudinally-extending rigid mandrel member having a front surface and upper and lower surfaces adjoining it along two edges, and
    a flat-formed dilatably inflatable pressure bag of the type having side walls reinforced against elongation in tension, one of its walls being adhered to the said surfaces of said mandrel member and covering said edges,
    whereby on positioning the mandrel member with its said covered edges inside such corner radii, inflation of said pressure bag causes it to apply even, bladder-like bonding pressure outwardly against such corner radii and forwardly against such internal surface therebetween.

7. A female bonding fixture for longitudinally-reinforced airfoils,
    longitudinally-extending upper and lower fixture parts mating at a parting plane and hollowed therefrom to define an airfoil-shaped cavity wherein to receive such structural members, one of said upper and lower fixture parts having, recessed within it and communicating with the cavity so defined, a plurality of spaced-apart longitudinally-extending parallel-sided grooves, rigid rail members slidably fitted within each of said fixture part grooves, inflatable pressure bags inserted within each of said grooves beneath said rail members, the other of said upper and lower fixture parts having a plurality of longitudinal pressure-applying surfaces along the airfoil-shaped cavity defined by the female fixture and opposite to and in registration with said slidably disposed rail members.

8. A bonding fixture assembly for use in bonding longitudinally-extending airfoils, comprising longitudinally-extending upper and lower female fixture parts mating at a parting plane and hollowed therefrom to define an airfoil-shaped cavity, one of said upper and lower fixture parts having, recessed within it and communicating with the cavity so defined, a plurality of spaced-apart longitudinally-extending parallel-sided grooves, rigid rail members slidably fitted within each of said fixture parts grooves, inflatable pressure bags inserted within each of said grooves beneath said rail members, the other of said upper and lower fixture parts having a plurality of fixed longitudinal pressure-applying surfaces along the airfoil-shaped cavity and opposite to and in registration with said slidably disposed rail members, together with a mandrel tool including a longitudinally-extending rigid member having a front surface and upper and lower surfaces adjoining it along two edges, and a flat-formed inflatable pressure bag of the type having side walls reinforced against elongation in tension, one of its walls being adhered to the said surfaces of said rigid mandrel member and covering said edges, whereby the forces and reactions applied internally by said mandrel tool are balanced by the pressure-applying fixed surfaces and slidable rails of said female fixture parts.

References Cited

UNITED STATES PATENTS

| | | | |
|---|---|---|---|
| 2,425,450 | 8/1947 | Young | 144—281 |
| 2,412,274 | 10/1946 | Kloote | 144—281 |
| 2,394,162 | 2/1946 | Gassner | 144—281 |

DOUGLAS J. DRUMMOND, *Primary Examiner.*